(12) United States Patent
Logan et al.

(10) Patent No.: US 6,581,967 B1
(45) Date of Patent: Jun. 24, 2003

(54) COCKPIT HAVING A FORWARD-TO-REARWARD DASH PLATE SLIP PLANE

(75) Inventors: Jeffrey Allen Logan, Oxford, MI (US); Christopher James McCalvin, Ortonville, MI (US)

(73) Assignee: Sommer Allibert, Farmington Hills, MI (US)

( * ) Notice: Subject to any disclaimer, the term of this patent is extended or adjusted under 35 U.S.C. 154(b) by 0 days.

(21) Appl. No.: 09/569,071

(22) Filed: May 11, 2000

(51) Int. Cl.[7] .............................................. B62D 25/14
(52) U.S. Cl. ............................ 280/779; 180/90; 296/72
(58) Field of Search ............................ 180/90; 296/72, 296/194, 197, 71, 73, 74, 191, 192, 196; 280/777, 779

(56) References Cited

U.S. PATENT DOCUMENTS

| | | | |
|---|---|---|---|
| 4,582,156 A | | 4/1986 | Kochy et al. ................. 180/90 |
| 4,597,461 A | * | 7/1986 | Kochy et al. ................. 180/90 |
| 4,682,788 A | * | 7/1987 | Yoshimura .................. 280/779 |
| 4,943,107 A | | 7/1990 | Rhodes, Jr. ................... 296/70 |
| 5,005,898 A | | 4/1991 | Benedetto et al. .......... 296/194 |
| 5,181,435 A | * | 1/1993 | Khalifa et al. .............. 280/779 |
| 5,234,246 A | * | 8/1993 | Henigue et al. .............. 180/90 |
| 5,294,164 A | | 3/1994 | Shimabara et al. ........... 296/72 |
| 5,387,023 A | | 2/1995 | Deneau ........................ 296/72 |
| 5,429,412 A | * | 7/1995 | Schoen et al. ............... 296/191 |
| 5,564,769 A | * | 10/1996 | Deneau et al. ................. 296/72 |
| 5,685,598 A | | 11/1997 | Inoue et al. ................. 296/194 |
| 5,938,266 A | | 8/1999 | Dauvergne et al. ........... 296/70 |
| 6,041,880 A | * | 3/2000 | Yamakaji et al. |

* cited by examiner

*Primary Examiner*—Brian L. Johnson
*Assistant Examiner*—Christopher Bottorff
(74) *Attorney, Agent, or Firm*—Lerner, David, Littenberg, Krumholz & Mentlik, LLP (57) ABSTRACT

A vehicle cockpit assembly, comprising: a cross-car support having leftward and rightward ends, each end being adapted to connect to respective left and right A-pillars of a vehicle; a wall member having a central area defined by a periphery and a support mount disposed at the central area, the wall member being connectable to the vehicle such that the wall member at least partially separates an engine compartment and a passenger compartment of the vehicle; a steering column support having a body connected to the cross-car support; and a brake sled including a body having a forward end, a rearward end, a first mount located at the forward end of the body and being operable to couple to the support mount of the wall member with forward-to-rearward adjustability, and a second mount located at the rearward end of the body and being operable to be fixedly couple to the steering column support.

33 Claims, 6 Drawing Sheets

COCKPIT HAVING A FORWARD-TO-REARWARD DASH PLATE SLIP PLANE

BACKGROUND OF THE INVENTION

1. Field of the Invention

The present invention is related to an apparatus which permits forward-to-rearward adjustability between two fixedly coupled members of a cockpit assembly during the manufacturing process of a vehicle and, more particularly, to a cockpit assembly in which the forward-to-rearward adjustability may be prevented by activating fastening elements of the cockpit assembly through an engine compartment of the vehicle.

2. Related Art

Vehicle manufacturers are often concerned with reducing the costs associated with constructing vehicles on an assembly line. In order to streamline the assembly process, the vehicle manufacturers often construct sub-assemblies in separate assembly lines and utilize the sub-assemblies as finished and/or semi-finished components in a main (or final) assembly line on which the vehicle is constructed.

Figure 1:
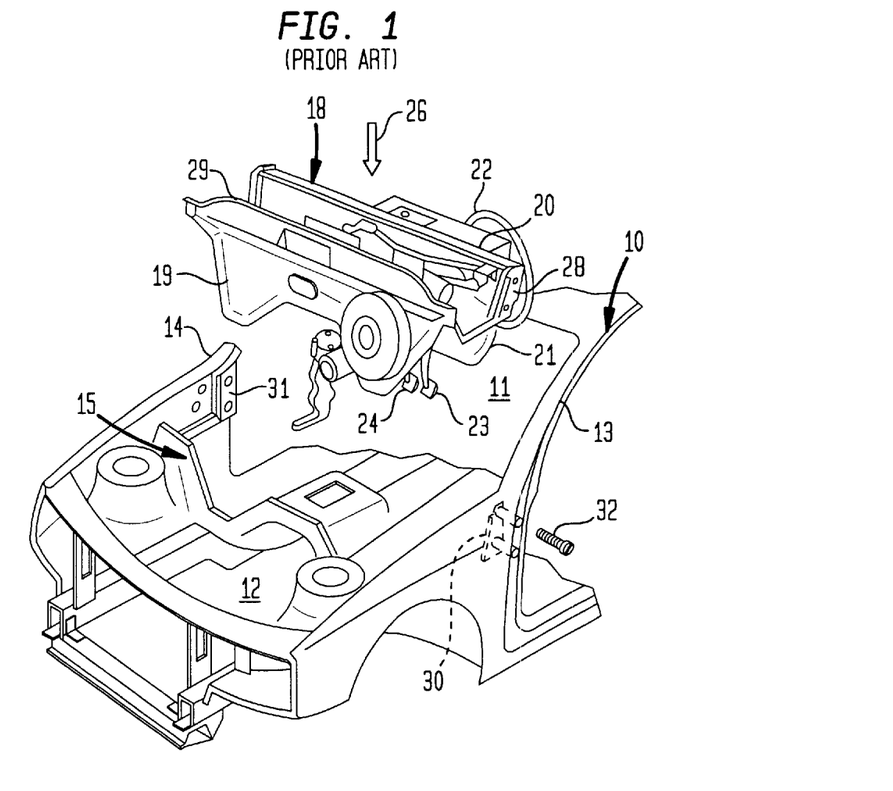
FIG. 1 is a partial perspective view of a body shell and cockpit assembly in accordance with the prior art.

One such sub-assembly which is of particular concern to vehicle manufacturers is a cockpit assembly. With reference to FIG. 1, a conventional cockpit assembly 18 may include a plurality of elements, such as the instrument panel 21 and the firewall 19. Those skilled in the art will appreciate that the instrument panel 21 includes many well known elements such as an instrument cluster, vehicle controls, stereo system, glove compartment, ventilation system, etc. The cockpit assembly 18 also includes a steering column support (not shown) which couples the steering wheel 22, among other things, to load bearing elements of the cockpit assembly 18. Those skilled in the art will appreciate that many other elements, such as the brake pedal 23, accelerator pedal 24, master cylinder, wire harnesses, transmission elements and controls, etc. may be included in the cockpit assembly 18.

In accordance with known assembly techniques, the cockpit assembly 18 is treated as a sub-assembly (i.e., a substantially fully assembled element) which is connected with a body shell 10 of a vehicle by lowering the cockpit assembly 18 into an opening 11 of the body shell 10 (downwardly as illustrated by arrow 26).

When the cockpit assembly 18 is in a suitable position, the firewall 19 is coupled to the vehicle sub-structure (or frame) at location 15. The firewall 19 shown in FIG. 1 fully separates the engine compartment 12 from a passenger compartment of the vehicle. As is known in the art, the firewall 19 is fixedly coupled to the vehicle sub-structure 15 using any of the known fasteners, such as bolts, screws, welds, rivets, etc. Thus, the firewall 19 is rigidly connected to the vehicle sub-structure 15 and should not move.

The instrument panel 21 and steering column support are fixedly coupled to a cross-car support 20 which, when the cockpit assembly 18 is installed in the vehicle, ensures that the instrument panel 21, steering wheel 22 and other linkages are properly positioned and/or fixed for use. The cross-car support 20 is fixedly coupled to another area of the vehicle sub-structure, namely, the A-pillars 13, 14. More particularly, a leftward end of the cross-car support 20 includes a mounting plate 28 which communicates with a corresponding plate 30 at A-pillar 13. Similarly, a rightward end of the cross-car support 20 includes a mounting plate 29 which communicates with a corresponding plate 31 of A-pillar 14. The cross-car support 20 is rigidly coupled to the vehicle sub-structure at the A-pillars 13, 14 using, for example, bolts 32.

The cross-car support 20 is also rigidly connected to the firewall 19 by way of intermediate linkages (not shown) which ensure that the instrument panel 21, steering wheel 22, and other cockpit assembly elements become rigidly positioned with respect to the firewall 19. Federal safety laws mandate that the steering column support be rigidly coupled to the firewall 19 via at least some of the intermediate linkages.

A substantial problem has been discovered with respect to the conventional cockpit assembly 18 of FIG. 1. In particular, when the firewall 19 is rigidly connected to the vehicle sub-structure 15, the mounting plates 28, 29 of the cross-car support 20 often do not line up with the corresponding plates 30, 31 of A-pillars 13 and 14, respectively. Indeed, manufacturing tolerances (particularly in the forward-to-rearward dimensions) between the vehicle sub-structure 15 and the A-pillars 13, 14 may vary. Further, component tolerances of the cockpit assembly 18 (again, in the forward-to-rearward dimensions) between the cross-car support 20 and firewall 19 may also vary.

Figure 2:
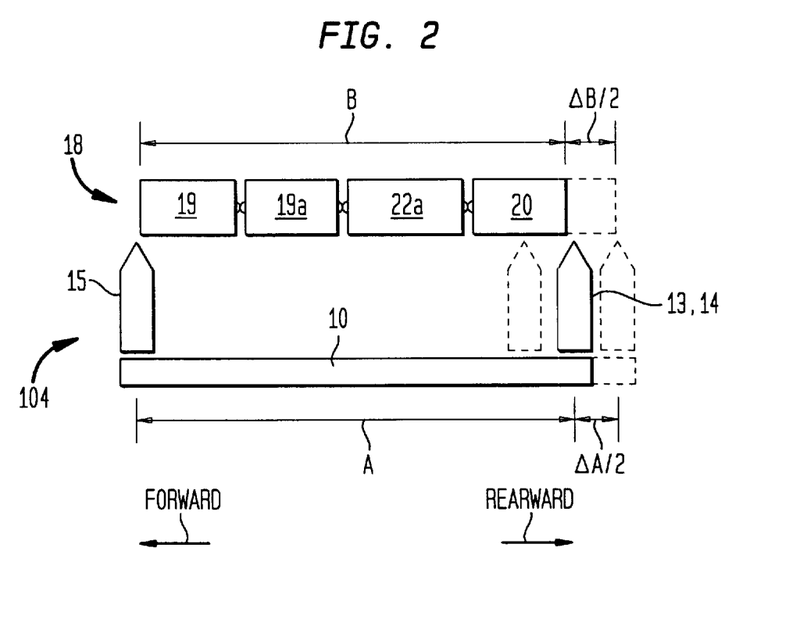
FIG. 2 is a schematic illustration of component tolerances concerning the body shell and the cockpit assembly of FIG. 1.

The problem associated with the forward-to-rearward tolerances may be better understood with reference to FIG. 2, which schematically illustrates the forward-to-rearward component stack-up of the body shell 10 and cockpit assembly 18. The body shell 10 is illustrated as an elongated member 10 extending in the noted forward-to-rearward direction. The vehicle sub-structure 15 is illustrated as a rigidly fixed member connected to the body shell 10 at a forward position. The A-pillars 13, 14 are illustrated as rigidly fixed members connected to the body shell 10 at a rearward position. An ideal forward-to-rearward dimension, A, exists between the vehicle sub-structure 15 and the A-pillars 13, 14. Due to component tolerances, however, the dimension A may vary by $\Delta A/2$ in either direction, resulting in a total tolerance of $\Delta A$. The cockpit assembly 18 is schematically illustrated as a forward-to-rearward stack-up of the firewall 19, the intermediate linkages 19a, the steering column support 22a and the cross-car support 20. The forward-to-rearward dimension of the cockpit assembly 18 is represented by the dimension B. Due to component tolerances of the cockpit assembly 18, dimension B of the cockpit assembly may vary by $\Delta B/2$ in either direction, resulting in a total tolerance of $\Delta B$.

As dimension A may vary by $+/-\Delta A/2$ and dimension B may vary by $+/-\Delta B/2$, the mounting plates 28, 29 of the cockpit assembly 18 and the mounting plates 30, 31 of the body shell 10 may not, and often do not, line up. Conversely, when the cross-car support 20 is connected to the body shell 10 before the firewall 19 is connected to the body shell 10, the firewall may not properly seat at sub-structure 15 (either because of interference or gap).

In an effort to alleviate this problem, vehicle manufacturers have attempted to drive the tolerances $\Delta A$ and $\Delta B$ towards zero. As to the cockpit assembly 18, reducing the tolerance $\Delta B$ to zero requires the use of a custom assembly fixture, which ensures that the forward-to-rearward dimension B is achieved without a substantial tolerance $\Delta B$. The costs associated with developing and utilizing such a fixture are excessive. Further, scrap costs increase substantially as the tolerance $\Delta B$ is driven towards zero. Similar problems are associated with driving the tolerance $\Delta A$ towards zero.

Accordingly, there is a need in the art for a new cockpit assembly and method of connecting a cockpit assembly to a vehicle body which: (i) does not require a custom cockpit assembly fixture; (ii) permits for variations in the forward-to-rearward dimensions of the cockpit assembly and/or the vehicle sub-structure; and (iii) meets the federal vehicle safety requirements regarding rigidity between the steering column support and the firewall.

SUMMARY OF THE INVENTION

In order to overcome the deficiencies of the prior art, a cockpit assembly in accordance with the invention includes: a cross-car support having leftward and rightward ends, each end being adapted to connect to respective left and right A-pillars of a vehicle; a wall member having a central area defined by a periphery and a support mount disposed at the central area, the wall member being connectable to the vehicle such that the wall member at least partially separates an engine compartment and a passenger compartment of the vehicle; a steering column support having a body connected to the cross-car support; and a brake sled including a body having a forward end, a rearward end, a first mount located at the forward end of the body and being operable to couple to the support mount of the wall member with forward-to-rearward adjustability, and a second mount located at the rearward end of the body and being operable to be fixedly coupled to the steering column support.

Preferably, at least one of the forward mount and the support mount includes one or more substantially forward-to-rearward directed slots, where the slots are operable to adjustably communicate with the other of the forward mount and the support mount. It is most preferred that the forward mount of the brake sled includes the forward-to-rearward directed slot and the support mount includes an aperture which communicates with the slot. The slot and aperture preferably receive a fastener (such as a bolt, screw, rivet, shaft, etc.) which permits the forward-to-rearward slidable adjustability between the brake sled and the wall member when the fastener is loose. The fastener preferably prohibits the forward-to-rearward adjustability when tightened.

The present invention also contemplates a method of installing a cockpit assembly into a vehicle, the cockpit assembly including a cross-car support; a wall member having a central area and a support mount disposed at the central area; a steering column support connected to the cross-car support; and a brake sled having a first mount located at a forward end thereof and being forward-to-rearward adjustably coupled to the support mount of the wall member, and a second mount located at a rearward end of the brake sled which is coupled to the steering column support, the method comprising: positioning the cockpit assembly in the vehicle; connecting the wall member to a first frame portion of the vehicle such that the wall member at least partially separates an engine compartment and a passenger compartment of the vehicle; permitting the brake sled to slidably adjust its forward-to-rearward position with respect to the wall member; connecting the cross-car support to leftward and rightward A-pillars of the vehicle; and fixing the brake sled to the wall member at the first mount and support mount such that the forward-to-rearward adjustability therebetween is prevented.

Other aspects, features, advantages, and objects of the present invention will become apparent to those skilled in the art from the disclosure herein taken in combination with the accompanying drawings.

BRIEF DESCRIPTION OF THE DRAWINGS

For the purposes of illustrating the invention, there are shown in the drawings forms which are presently preferred, it being understood, however, that the present invention is not limited to the precise arrangements and instrumentalities shown.

DETAILED DESCRIPTION OF THE PRESENT INVENTION

Figure 3:
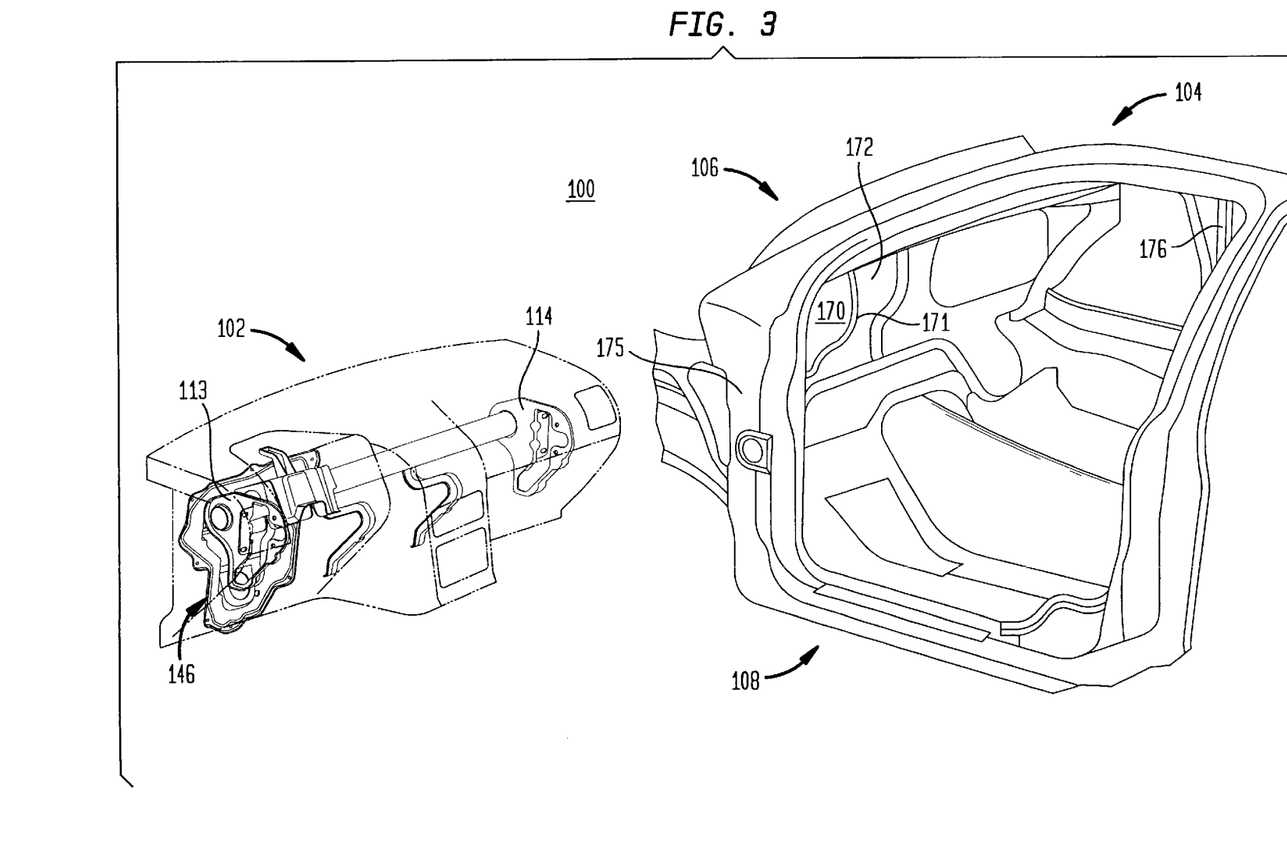
FIG. 3 is a partial perspective view of a body shell and cockpit assembly in accordance with the present invention.

Reference is now made to FIG. 3, which illustrates a partial perspective view of a vehicle 100 undergoing an assembly process in accordance with the present invention. The vehicle 100 includes a cockpit assembly 102 and body shell 104. The cockpit assembly 102 is positioned within the body shell 104 during the assembly process by way of windshield opening 106 or door opening 108. Those skilled in the art will appreciate, however, that other modes of locating the cockpit assembly 102 in the body shell 104 are well within the purview of the invention.

Figure 4:
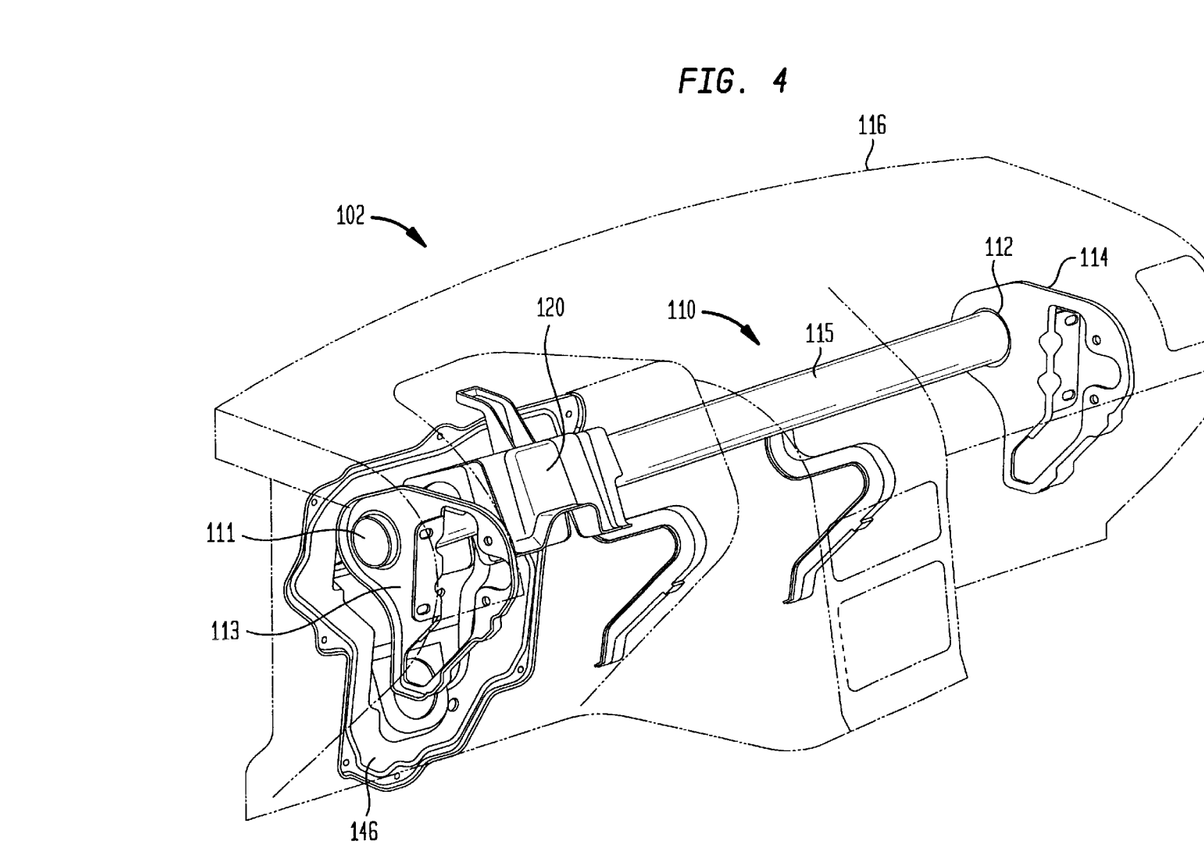
FIG. 4 is a partial perspective view of the cockpit assembly of FIG. 3.
Figure 5:
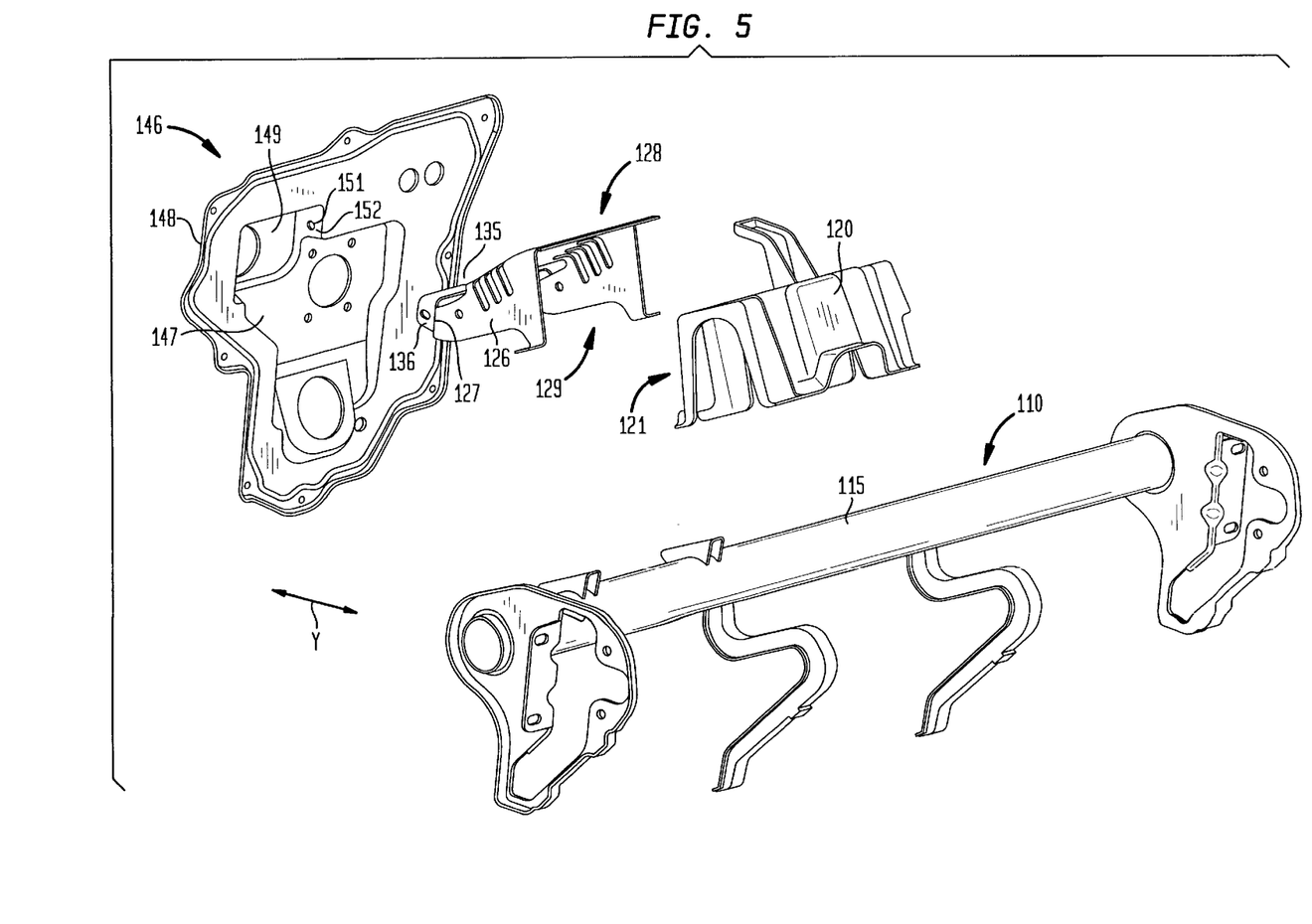
FIG. 5 is an exploded perspective view of the cockpit assembly of FIGS. 3 and 4.

As best seen in FIG. 4, the cockpit assembly 102 includes a cross-car support 110 having a longitudinal shaft 115, a leftward end 111, and a rightward end 112. Each of the leftward and rightward ends 111, 112 of the cross-car support 110 are preferably rigidly connected to a respective mounting plate 113, 114. The cockpit assembly 102 also includes a steering column support 120 having a body which is rigidly coupled to the cross-car support 110. As best seen in FIG. 5, the steering column support 120 preferably includes a channel 121 (formed within or by the body of the steering column support 120) which is operable to receive the longitudinal shaft 115 of the cross-car support 110. The body of the steering column support 120 preferably includes a plurality of mounting elements (such as apertures, detents, shafts, etc.) which are operable to couple with elements of a steering column (not shown) such that the steering column is well supported with respect to the cross-car support 110.

The cockpit assembly 102 preferably also includes a brake sled 126 (FIG. 5) including a body having a forward end 127 and a rearward end 128. A first mount 135 (best seen in FIG. 6a) is disposed at the forward end 127 of the brake sled body 126. A second mount, generally designated 129 in FIG. 5, is disposed at the rearward end 128 of the brake sled body 126. The second mount 129 is preferably operable to fixedly couple to the steering column support 120 such that the brake sled 126 is rigidly and fixedly positioned with respect to the cross-car support 110. Preferably, the second mount 129 includes any of the known mounting elements (such as flanges, apertures, shafts, etc.) for connecting the brake sled 126 to the steering column support 120. The second mount 129 also preferably includes one or more flanges 130 (best seen in FIG. 6b) having apertures 131 therethrough, which apertures 131 communicate with corresponding flanges/apertures (not shown) of the steering column support 120. Any suitable fastener, such as a bolt, screw, shaft, etc. may be utilized to fixedly couple the second mount 129 of the brake sled 126 to the steering column support 120 in accordance with the invention.

Those skilled in the art will appreciate that the brake sled 126 is indirectly, rigidly and fixedly positioned with respect to the cross-car support 110 by way of steering column support 120. Those skilled in the art will appreciate, however, that the brake sled 126 may be directly coupled to the cross-car support 110 by way of second mount 129 if desired.

Referring to FIG. 5, the cockpit assembly 102 preferably includes a wall member 146 (also referred to as a dash plate, partial firewall, etc.) having a central area 147 defined by a periphery 148. It is understood by the artisan that the central area 147 need not be defined at the precise center of the wall member 146, but rather may be defined at any location within the periphery 148. The wall member 146 includes a support mount 149 disposed at the central area 147 which is connectable to the body shell 104 (FIG. 3) of the vehicle 100. The first mount 135 of the brake sled 126 is preferably operable to couple to the support mount 149 of the wall member 146 with forward-to-rearward adjustability, i.e., such that the relative positions of the brake sled 126 and wall member 146 may be adjusted in a direction corresponding to arrow Y (FIG. 5).

Figure 6A:
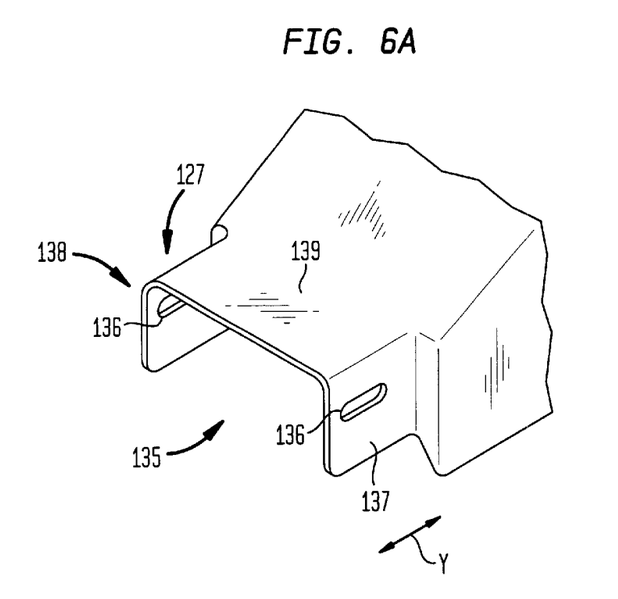
FIGS. 6a and 6b are a partial perspective and side elevational view, respectively, of a brake sled in accordance with the present invention.
Figure 6B:
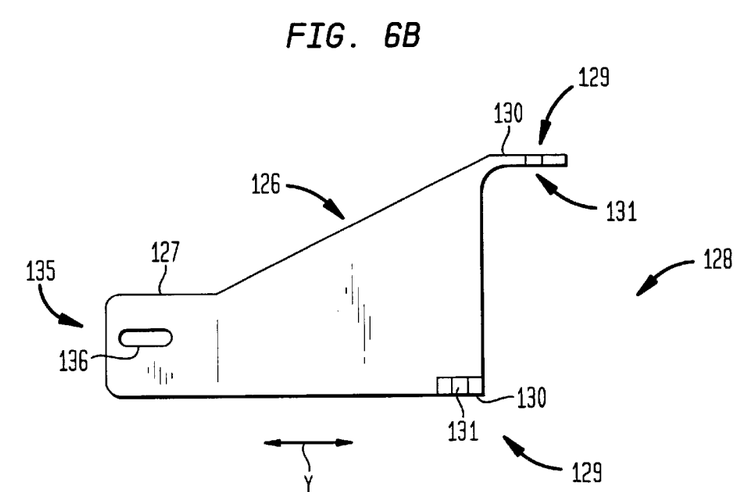

In order to achieve the forward-to-rearward adjustability of the wall member 146 and brake sled 126, the first mount 135 of the brake sled 126 preferably includes at least one substantially forward-to-rearward directed slot 136 (best seen in FIGS. 6a and 6b) which is operable to adjustably communicate with the support mount 149 of the wall member 146. With reference to FIG. 6a, the first mount 135 preferably includes a first surface 137 having a length extending substantially in the forward-to-rearward direction Y and a height extending perpendicular to the Y direction. The slot 136 is preferably disposed in the first surface 137. Those skilled in the art will appreciate that although the term "surface" is utilized with respect to reference numeral 137 of first mount 135, item 137 will have some finite thickness. Indeed, in this context, surface 137 is intended to be considered associated with a member having a thickness where the thickness is determined by strength, weight, and cost considerations as is well known in the art.

It is most preferred, that the first mount 135 include a second surface 138 spaced away from the first surface 137, it being understood that the second surface 138 is also to be considered associated with a member having some finite thickness. More particularly, the second surface 138 preferably includes a length extending substantially in the forward-to-rearward direction Y and a height extending substantially perpendicular to the direction Y. Another forward-to-rearward directed slot 136 is preferably disposed in the second surface 138 which is operable to adjustably communicate with the support mount 149 of the wall member 146. It is most preferred that surfaces 137 and 138 are coupled together and strengthened by at least one cross portion 139 extending between respective edges of surfaces 137 and 138.

Figure 7A:
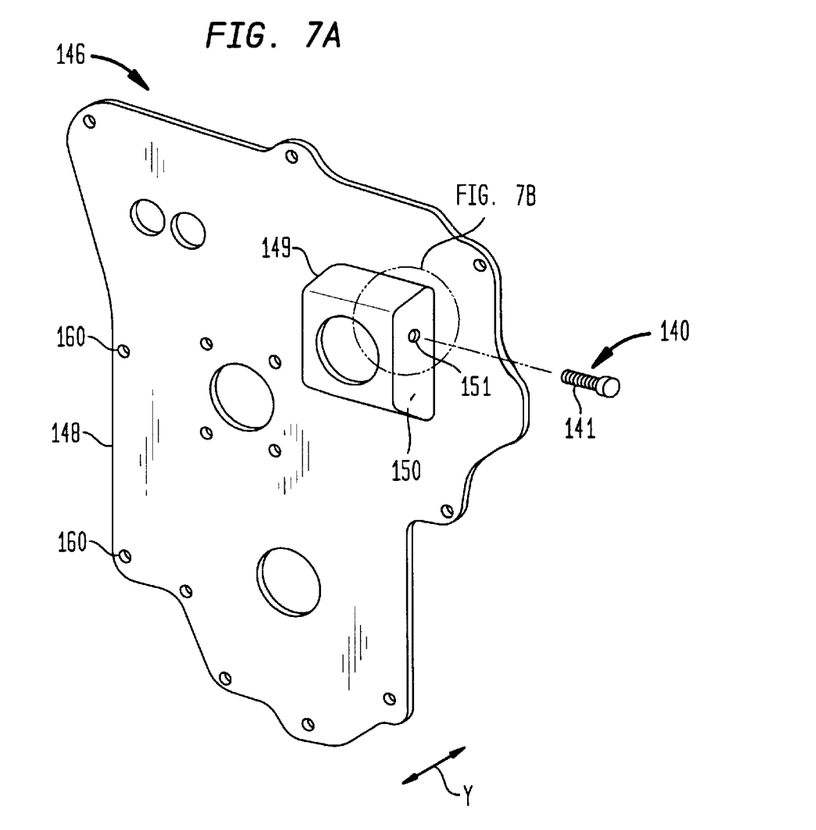
FIGS. 7a and 7b are perspective views of a dash plate in accordance with the present invention.

With reference to FIGS. 5 and 7a, additional details of the support mount 149 will now be described. Those skilled in the art will appreciate that the support mount 149 is viewed from a rearward direction in FIG. 5 and is viewed from a forward direction in FIG. 7a. With reference to FIG. 7a, the support mount 149 of the wall member 146 preferably includes a first slip surface 150 in slidable communication with the first surface 137 of the first mount 135 of the brake sled 126. Again, the slip surface 15 may be considered by the artisan to be associated with a member having a finite thickness. An aperture 151 is preferably disposed in the first slip surface 150, which aperture 151 is in communication with the slot 136 of the first mount 135. The slot 136 and aperture 151 are preferably sized and shaped to receive a fastener 140 (such as a bolt, screw, rivet, shaft, etc.) which permits forward-to-rearward slidable adjustability between the brake sled 126 and the wall member 146 when the fastener 140 is loose. Conversely, the fastener 140 preferably prohibits the forward-to-rearward adjustability between the brake sled 126 and the wall member 146 when in a tightened state. It is most preferred that the fastener 140 (FIG. 7a) include a shaft 141 which is received by the aperture 151 and slot 136 such that the slot 136 slidably engages the shaft 141 and permits the forward-to-rearward slidable communication between the brake sled 126 and the wall member 146. Skilled artisans will appreciate that the fastener 140 may include a shaft portion extending from at least one of the first mount 135 of the brake sled 126 and the support mount of the wall member 146. This type of fastener 140 would preferably be tightened by way of a spot weld.

As best seen in FIG. 5, the support mount 149 preferably also includes a second slip surface 152 (associated with a member of finite thickness) having an aperture 151 therein. The second slip surface 152 is preferably in slidable communication with the second surface 138 of the first mount 135 (FIG. 6a). Preferably, the aperture 151 of the second slip surface 152 is in communication with the respective slot 136 of the second surface 138 of the first mount 135. Further, another fastener (not shown) preferably communicates with aperture 151 and slot 136 so as to permit and/or prevent slidable communication between the brake sled 126 and the wall member 146.

Figure 7B:
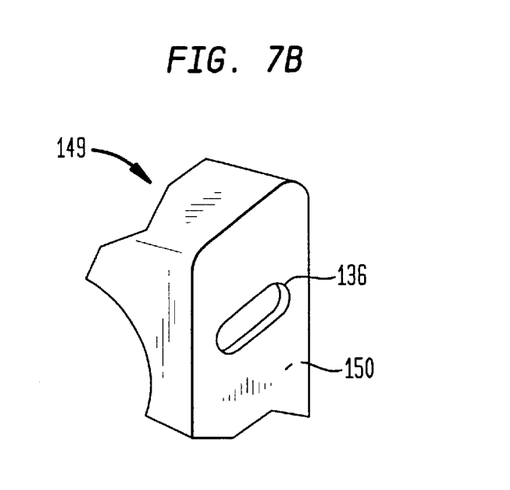

Those skilled in the art will appreciate that although forward-to-rearward directed slots 136 are shown disposed in the first mount 135 of the brake sled 126, one or more of the slots 136 may alternatively and/or additionally be disposed at the support mount 149 of the wall member 146. In particular, with reference to FIG. 7b, the apertures 151 may be substituted with slots 136. When slots 136 are disposed in one or more of the first and second slip surfaces 150, 152, those skilled in the art will appreciate that the slots 136 of the first mount 135 (FIG. 6a) may be substituted with substantially round apertures 151 without sacrificing the advantages of forward-to-rearward adjustability between the brake sled 126 with respect to the wall member 146.

With reference to FIG. 3, the wall member 146 is preferably connectable to the body shell 104 of the vehicle 100 such that the wall member 146 at least partially separates an engine compartment from a passenger compartment of the vehicle 100. More particularly, the body shell 104 of the vehicle 100 preferably includes an opening 170 circumscribed by a peripheral edge 171, where the opening 170 communicates between the engine compartment and the passenger compartment of the vehicle 100. As shown, the body shell 104 includes a wall 172 (partial firewall) which at least partially separates the engine compartment and the passenger compartment of the vehicle 100. Preferably, the wall member 146 of the cockpit 102 at least partially separates the engine compartment and passenger compartment of the vehicle when installed. More particularly, the periphery 148 of the wall member 146 preferably coincides with the peripheral edge 171 of the opening 170 such that the wall member 146 closes the opening 170 when installed in the vehicle 100. Most preferably, the wall member 146 includes a plurality of mounting elements 160 and the peripheral edge 171 includes corresponding mounting elements such that the wall member 146 may be fixedly coupled to the body shell 104.

In accordance with the invention, it is preferred that the one or more fasteners 140 are in a loose state when the cockpit assembly 102 is first introduced into the body shell 104 such that the wall member 146 and brake sled 126 are free to move with respect to one another in the forward-to-rearward direction Y. Thus, the wall member 146 may be fixedly coupled to the wall 172 of the body shell 104 and the cross-car support 110 may be fixedly coupled to the A-pillars 175, 176 of the body shell 104 while permitting slidable adjustability between the brake sled 126 and the wall member 146. When the wall member 146 and cross-car support 110 are fixedly secured to the body shell 104, the fasteners 140 are preferably tightened such that the slidable adjustability between the wall member 146 and the brake sled 126 is prevented.

The cross-car support 110 is preferably fixedly coupled to the body shell 104 at respective leftward and rightward A-pillars 175, 176. More particularly, the leftward mounting plate 113 of the cross-car support 110 is preferably connectable to the A-pillar 175 while the rightward mounting plate 114 of the cross-car support is preferably connectable to the A-pillar 176.

Advantageously, the cockpit assembly 102 of the present invention readily accommodates any forward-to-rearward tolerances of the body shell 104 from, for example, the peripheral edge 171 to either one or both of the A-pillars 175, 176. Thus, costly precision fixtures are not necessary in producing the cockpit assembly 102, and ultra precise tolerances of the body shell 104 are likewise not required. Consequently, federal vehicle safety requirements concerning a rigid connection between the steering column support and firewall 19 may be met at a relatively low cost.

As best seen in FIG. 7a, first and second slip surfaces 150, 152 extend forward of the general plane of the wall member 146 such that the support mount 149 extends somewhat in or towards the engine compartment of the vehicle 100. Advantageously, the fasteners 140 may be inserted and/or tightened from leftward and rightward directions through the engine compartment. Advantageously, assembly workers, and/or robotic assembly devices may readily access the support mount 149 without violating ergonomic concerns or requiring overly complicated maneuvering.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A vehicle cockpit assembly, comprising:
   a cross-car support having leftward and rightward ends, each end being adapted to connect to respective left and right A-pillars of a vehicle;
   a wall member having a central area defined by a periphery and a support mount disposed at the central area, the wall member being connectable to the vehicle such that the wall member at least partially separates an engine compartment and a passenger compartment of the vehicle;
   a steering column support having a body connected to the cross-car support; and
   a brake sled including a body having a forward end, a rearward end, a first mount located at the forward end of the body and being forward-to-rearward adjustable coupled to the support mount of the wall member, and a second mount located at the rearward end of the body and being operable to be fixedly coupled to the steering column support.

2. The vehicle cockpit assembly of claim 1, wherein at least one of the first mount and the support mount includes at least one substantially forward-to-rearward directed slot being operable to adjustably communicate with the other of the forward mount and the support mount.

3. The vehicle cockpit assembly of claim 2, wherein the first mount of the brake sled includes a first surface having a length extending substantially in the forward-to-rearward direction and a height extending perpendicular thereto, the first surface slidably communicating with the support mount.

4. The vehicle cockpit assembly of claim 3, wherein the support mount of the wall member includes a slip surface in slidable communication with the first surface of the brake sled and the at least one slot is disposed in at least one of the first surface and the slip surface.

5. The vehicle cockpit assembly of claim 4, wherein the at least one slot is operable to receive a fastener which permits forward-to-rearward slidable adjustability between the brake sled and the wall member when in a loose state, the fastener prohibiting the forward-to-rearward adjustability when in a tightened state.

6. The vehicle cockpit assembly of claim 5, wherein:
   at least one of the first surface of the first mount and the slip surface of the support mount includes an aperture in communication with the at least one slot of the other of the first surface and the slip surface; and
   the fastener includes a shaft received by the aperture and the at least one slot such that the slot slidably engages the shaft and permits the forward-to-rearward slidable communication between the brake sled and the wall member.

7. The vehicle cockpit assembly of claim 6, wherein the fastener is taken from the group consisting of: bolts, screws, rivets, and spot welds.

8. The vehicle cockpit assembly of claim 3, wherein:
   the first mount of the brake sled further includes a second surface spaced away from the first surface, the second surface having a length extending substantially in the forward-to-rearward direction, and a height extending perpendicular thereto; and
   the second surface is in slidable communication with the support mount of the wall member.

9. The vehicle cockpit assembly of claim 8, wherein:
   the support mount of the wall member includes first and second slip surfaces in slidable communication with the first and second surfaces of the brake sled, respectively;
   at least one of the first surface of the first mount and the first slip surface of the support mount includes a substantially forward-to-rearward directed slot being operable to adjustably communicate with the other of the first surface and the first slip surface; and
   at least one of the second surface of the first mount and the second slip surface of the support mount includes a substantially forward-to-rearward directed slot being operable to adjustably communicate with the other of the second surface and the second slip surface.

10. The vehicle cockpit assembly of claim 9, wherein the slots are operable to receive respective fasteners which permit forward-to-rearward slidable adjustability between the brake sled and the wall member when in loose states, the fasteners prohibiting the forward-to-rearward adjustability when in tightened states.

11. The vehicle cockpit assembly of claim 10, wherein:
each of the first and second surfaces of the first mount and the first and second slip surfaces of the support mount, which do not have a slot, include an aperture in communication with a respective one of the slots; and
each fastener includes a shaft received by the respective apertures and slots such that the slots slidably engage the respective shafts and permit the forward-to-rearward slidable communication between the brake sled and the wall member.

12. The vehicle cockpit assembly of claim 11, wherein the fasteners are taken from the group consisting of: bolts, screws, rivets, and spot weldable shaft portions.

13. The vehicle cockpit assembly of claim 10, wherein the first and second slip surfaces of the support mount are positioned such that the fasteners are accessible through the engine compartment for tightening.

14. The vehicle cockpit assembly of claim 13, wherein the first and second slip surfaces of the support mount are positioned such that the fasteners are accessible through the engine compartment from leftward and rightward directions for tightening.

15. The vehicle cockpit assembly of claim 10, wherein the periphery of the wall member defines a plane and the first and second slip surfaces extend outwardly from the plane such that the fasteners are accessible from the leftward and rightward directions.

16. A brake sled for a vehicle cockpit assembly, comprising:
a body including a forward end and a rearward end, the body being operable to fixedly couple a steering column support to a wall member of the cockpit assembly;
a first mount located at the forward end of the body and being forward-to-rearward adjustably coupled to the wall member of the cockpit assembly; and
a second mount located at the rearward end of the body and being operable to be fixedly coupled to the steering column support.

17. The brake sled of claim 16, wherein the first mount includes at least one substantially forward-to-rearward directed slot being operable to adjustably communicate with the wall member.

18. The brake sled of claim 17, wherein the first mount includes a first surface having a length extending substantially in the forward-to-rearward direction and a height extending perpendicular thereto, the at least one slot being disposed in the first surface.

19. The brake sled of claim 18, wherein the first mount further includes: a second surface spaced away from the first surface and having a length extending substantially in the forward-to-rearward direction and a height extending perpendicular thereto; and at least one substantially forward-rearward directed slot disposed in the second surface and being operable to adjustably communicate with the wall member.

20. The brake sled of claim 17, wherein the at least one slot is operable to receive a fastener which permits the forward-to-rearward adjustability between the brake sled and the wall member when in a loose state, the fastener prohibiting the forward-to-rearward adjustability when in a tightened state.

21. The brake sled of claim 20, wherein the fastener is taken from the group consisting of: bolts, screws, rivets, shafts, and spot welds.

22. A method of installing a cockpit assembly into a vehicle, the cockpit assembly including a cross-car support; a wall member having a central area and a support mount disposed at the central area; a steering column support connected to the cross-car support; and a brake sled having a first mount located at a forward end thereof and being forward-to-rearward adjustably coupled to the support mount of the wall member, and a second mount located at a rearward end of the brake sled which is coupled to the steering column support, the method comprising:
positioning the cockpit assembly in the vehicle;
connecting the wall member to a first frame portion of the vehicle such that the wall member at least partially separates an engine compartment and a passenger compartment of the vehicle;
permitting the brake sled to slidably adjust its forward-to-rearward position with respect to the wall member; and
connecting the cross-car support to leftward and rightward A-pillars of the vehicle; and
fixing the brake sled to the wall member at the first mount and support mount such that the forward-to-rearward adjustability therebetween is prevented.

23. The method of claim 22, wherein the first mount of the brake sled includes a first surface having a length extending substantially in the forward-to-rearward direction and a height extending perpendicular thereto, the first surface slidably communicating with the support mount.

24. The method of claim 23, wherein:
the first mount of the brake sled further includes a second surface spaced away from the first surface, the second having a length extending substantially in the forward-to-rearward direction, and a height extending perpendicular thereto; and
the second surface is in slidable communication with the support mount of the wall member.

25. The method of claim 24, wherein:
the support mount of the wall member includes first and second slip surfaces in slidable communication with the first and second surfaces of the brake sled respectively;
at least one of the first surface of the first mount and the first slip surface of the support mount includes a substantially forward-to-rearward directed slot being operable to adjustably communicate with the other of the first surface and the first slip surface; and
at least one of the second surface of the first mount and the second slip surface of the support mount includes a substantially forward-to-rearward directed slot being operable to adjustably communicate with the other of the second surface and the second slip surface.

26. The method of claim 25, wherein the slots are operable to receive respective fasteners which permit forward-to-rearward slidable adjustability between the brake sled and the wall member during loose states, the fasteners prohibiting the forward-rearward communication when in tightened states.

27. The method of claim 26, wherein:
each of the first and second surfaces of the first mount and the first and second slip surfaces of the support mount, which do not have a slot, include an aperture in communication with a respective one of the slots; and
each fastener includes a shaft received by the respective apertures and slots such that the slots slidably engage the respective shafts and permit the forward-to-rearward slidable communication between the brake sled and the wall member.

28. The method of claim 26, wherein the first and second slip surfaces of the support mount are positioned such that the fasteners are accessible through the engine compartment for tightening.

29. The method of claim 28, wherein the first and second slip surfaces of the support mount are positioned such that the fasteners are accessible through the engine compartment from leftward and rightward directions for tightening.

30. The method of claim 29, wherein the periphery of the wall member defines a plane and the first and second slip surfaces extend outwardly from the plane such that the fasteners are accessible from the leftward and rightward directions.

31. A vehicle cockpit assembly, comprising:
- a cross-car support having leftward and rightward ends, each end being adapted to connect to respective left and right A-pillars of a vehicle;
- a wall member having a central area defined by a periphery and a support mount disposed at the central area, the wall member being connectable to the vehicle such that the wall member at least partially separates an engine compartment and a passenger compartment of the vehicle;
- a steering column support having a body connected to the cross-car support;
- a brake sled including a body having a forward end, a rearward end, a first mount located at the forward end of the body and being operable to couple to the support mount of the wall member with forward-to-rearward adjustability, and a second mount located at the rearward end of the body and being operable to be fixedly coupled to the steering column support; and
- at least one fastener operable to permit forward-to-rearward adjustability between the brake sled and the wall member when in a first state, and to prohibit the forward-to-rearward adjustability when in a second state, wherein the fastener is accessible through the engine compartment for changing between the first and second states.

32. A brake sled for a vehicle cockpit assembly, comprising:
- a body including a forward end and a rearward end, the body being operable to fixedly couple a steering column support to a wall member of the cockpit assembly, the wall member being connectable to the vehicle such that the wall member at least partially separates an engine compartment and a passenger compartment of the vehicle;
- a first mount located at the forward end of the body, being operable to couple to the wall member of the cockpit assembly with forward-to-rearward adjustability, and being operable to communicate with at least one fastener, which permits the forward-to-rearward adjustability between the brake sled and the wall member when in a first state, and which prohibits the forward-to-rearward adjustability when in a second state, the fastener being accessible through the engine compartment for changing between the first and second states; and
- a second mount located at the rearward end of the body and being operable to be fixedly coupled to the steering column support.

33. A method of installing a cockpit assembly into a vehicle, the cockpit assembly including a cross-car support; a wall member having a central area and a support mount disposed at the central area, the wall member being connectable to the vehicle such that the wall member at least partially separates an engine compartment and a passenger compartment of the vehicle; a steering column support connected to the cross-car support; and a brake sled having a first mount located at a forward end thereof and a second mount located at a rearward end of thereof which is coupled to the steering column support, the brake sled being forward-to-rearward adjustably coupled to the support mount of the wall member, and being operable to communicate with at least one fastener, which permits the forward-to-rearward adjustability between the brake sled and the wall member when in a first state, and which prohibits the forward-to-rearward adjustability when in a second state, the method comprising:
- positioning the cockpit assembly in the vehicle;
- connecting the wall member to a first frame portion of the vehicle such that the wall member at least partially separates an engine compartment and a passenger compartment of the vehicle;
- permitting the brake sled to slidably adjust its forward-to-rearward position with respect to the wall member; and
- connecting the cross-car support to leftward and rightward A-pillars of the vehicle; and
- fixing the brake sled to the wall member at the first mount and support mount using the fastener by way of access through the engine compartment such that the forward-to-rearward adjustability therebetween is prevented.

* * * * *

UNITED STATES PATENT AND TRADEMARK OFFICE
CERTIFICATE OF CORRECTION

PATENT NO.   : 6,581,967 B1
DATED        : June 24, 2003
INVENTOR(S)  : Jeffrey Allen Logan and Christopher James McCalvin It is certified that error appears in the above-identified patent and that said Letters Patent is hereby corrected as shown below:

<u>Title page,</u>
Item [57], ABSTRACT,
Line 15, "couple" should read -- coupled --.

<u>Column 8,</u>
Line 5, "adjustable" should read -- adjustably --.

<u>Column 9,</u>
Lines 58 and 59, "forward-rearward" should read -- forward-to-rearward --.

<u>Column 10,</u>
Line 59, "forward-rearward" should read -- forward-to-rearward --.

<u>Column 12,</u>
Line 25, delete "of" after -- rearward end --.

Signed and Sealed this

Seventh Day of October, 2003

JAMES E. ROGAN
*Director of the United States Patent and Trademark Office*